United States Patent [19]

Yates et al.

[11] Patent Number: 4,770,368

[45] Date of Patent: Sep. 13, 1988

[54] TURBINE/AIR VENT REELING MACHINE

[75] Inventors: John S. Yates, Fountain Valley; Roger D. Brum, Irvine, both of Calif.

[73] Assignee: Southwest Aerospace Corporation, Santa Ana, Calif.

[21] Appl. No.: 710,905

[22] Filed: Mar. 12, 1985

[51] Int. Cl.⁴ .............................................. B64D 3/02
[52] U.S. Cl. .................................... 244/1 TD; 244/3; 273/361; 254/360
[58] Field of Search ............... 244/1 TD, 3; 273/360, 273/361; 254/274, 275, 276, 360; 328/165, 167

[56] References Cited

U.S. PATENT DOCUMENTS

| | | | |
|---|---|---|---|
| 2,751,167 | 6/1956 | Hopper et al. | 273/361 |
| 2,760,777 | 8/1956 | Cotton | 244/3 |
| 4,125,812 | 11/1978 | Polonio | 328/165 |
| 4,496,159 | 1/1985 | Dugan et al. | 244/3 |

Primary Examiner—Sherman D. Basinger
Assistant Examiner—Rodney Corl
Attorney, Agent, or Firm—Stetina and Brunda

[57] ABSTRACT

A turbine/air vent reeling machine for use in aerial towed target applications and the like disclosed characterized by use of a novel turbine head/air vent design which extracts ram air energy from the wind stream impinging upon a moving aircraft for the purpose of driving and braking the reeling machine for pay-in and pay-out of a towed target. Control of the turbine rotational speed is achieved through plural variable opening vents located aft of the turbine head which are driven through an open and closed orientation by a servo-motor to throttle the air mass flow through the turbine head. Turbine speed is sensed by a tachometer which is coupled to a shaft driven by the turbine. The tachometer output voltage is introduced into a closed loop control circuit including processing electronics which compares the tachometer voltage to a pre-selected set point voltage corresponding to the desired rotational speed of the turbine. The difference between the desired and actual tachometer voltage and its derivative and integral values with respect to time are mixed and amplified to drive the servo-motor to adjust the vent opening in a direction that will cause the turbine to accelerate or decelerate to a desired operational speed. The servo-motor rotation is converted to vent door movement via an actuation mechanism which ensures the vent doors will remain in a closed position in the event that power is removed from the servo-motor.

5 Claims, 4 Drawing Sheets

U.S. Patent  Sep. 13, 1988  Sheet 1 of 4  4,770,368
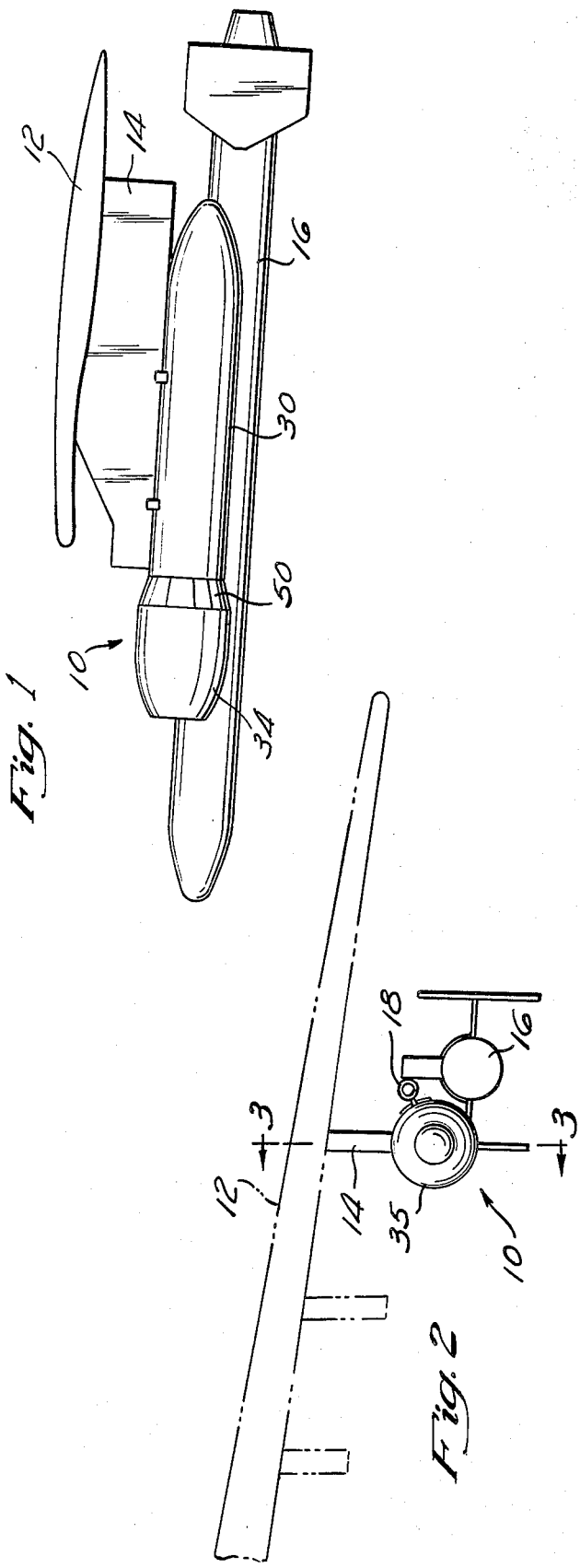
Fig. 1
Fig. 2
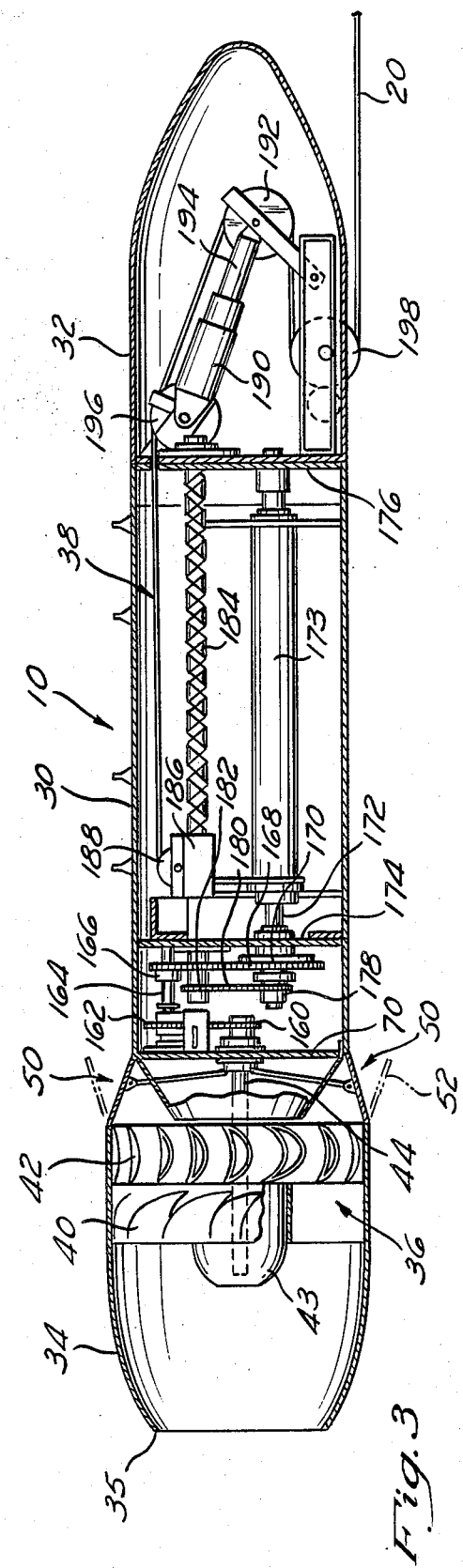
Fig. 3

TURBINE/AIR VENT REELING MACHINE

FIELD OF THE INVENTION

The field of the present invention is generally related to the aircraft art and, more particularly, to the aircraft art as it pertains to towed devices such as aerial targets and other devices which are towed on a tow cable selectively extensible from an aircraft by means of a cable reeling machine. The field of the present invention additionally relates to a turbine/air vent mechanism which extracts ram air energy from the windstream relative to a moving aircraft for the purpose of driving the reeling machine for reeling in a towed target as well as braking the reeling machine for reeling out a towed target in a manner to prevent the target weight and drag from accelerating the reeling machine above desirable operating speeds.

BACKGROUND OF THE INVENTION

In military applications, reeling devices for aerial towed targets and the like are well known and are used to reel out and reel in a towed target from a moving aircraft at desired speeds. In the past, such reeling machines have utilized electric motors, turbine driven devices as well as other types of supplementary power devices and brakes to reel equipment in and out from an aircarft. More recently, the prior art has developed reeling machines powered by means of an air driven turbine which are preferable to other prior art devices in that they can take advantage of the available power produced by ram air energy impinging upon the device during aircraft flight.

Although a variety of prior art air turbine reeling machines have been developed, most of such prior art turbine reeling machines have had their turbine blades exposed or have utilized variably pitched turbine blades which are extremely expensive for the purposes of providing variable reeling speeds to the reeling equipment. Further, such prior art turbine powered reeling machine devices have typically suffered from the their inability to utilize the turbine output for both a power source for reeling in, as well as, a power dissipator paying out applications. Examples of such prior art turbine powered devices are shown in U.S. Pat. Nos. 2,760,777 issued to Cotton; 2,778,584 issued to Wilson; and, 2,892,599 issued to Baldwin, et al., all of which fail to use the turbine rotor of the reeling machine to provide for reeling in and reeling out applications of the reeling machine. In this regard, Cotton, Wilson and Bladwin all disclose fixed pitch turbine blade design concept with various means of throttling the air mass flow through the turbine in order to solely control the reel in rate not the reel out rate. Cotton controls reel or pay out rate by means of a motor applied friction brake, while Wilson and Baldwin both rely upon centrifugally applied friction brakes to control reel out rate or speed. The use of such friction brakes to provide torque to oppose target drag is undesirable since its generates significant heat and wear due to relatively large power dissipation requirements.

In recognizing the heat and wear problems due to such friction brake designs, a prior art device shown in Hopper, et al., U.S. Pat. No. 2,751,167 discloses a variable pitch turbine in which the blades of the turbine may be rotated to various attack angles to provide torque for reel in or provide opposing torque for reel out applications. However, such variable pitch turbine blade designs are extremely expensive, require constant operator monitoring of turbine speed and, hence, have not been widely utilized in the prior art.

Alternatively, Hopper proposes a fixed pitch turbine coupled to a reversing gear train to achieve the required reel in, reel out bi-directional operation. The complexity of a reversing gear train has prevented the design's wide spread use.

As such, there exists a substantial need in the art for an improved aerial tow target reeling machine which utilizes a turbine head design to take advantage of the impinging ram air force existing during aircraft flight and which allows bi-directional turbine rotational operation with a fixed turbine blade configuration so as to provide proper reeling out and reeling in speeds for the reeling machine without the heretofore requirement of supplemental frictional brakes, variable pitched turbine blades and/or reversing gear trains.

SUMMARY OF THE INVENTION

The present invention specifically addresses and alleviates the above-referenced deficiencies associated in the prior art by providing a fixed pitch blade turbine to extract ram energy from the windstream relative to a moving aircraft for the purpose of driving the reeling machine for reeling in a towed target as well as braking the reeling machine for reeling out a towed target to prevent the target weight and drag from accelerating the reeling machine above desirable reeling speed limits. The improved function of the present invention over the prior art is made possible by a novel turbine blade design which allows bi-directional operation of the reeling machine as well as a novel air vent turbine speed control mechanism. The use of the fixed blade turbine design allows bi-directional operation to permit the turbine to be direct drive coupled to a tow cable spool without clutches or reversing gear trains as heretofore required, while the necessary torque for reel in and reel out capability can be provided by the turbine without the use of auxilliary speed control brakes. In the present invention it is only necessary to throttle the mass flow of air through the turbine by way of the novel air vent design and control mechanism.

More particularly, the present invention comprises a turbine/air vent reeling machine having housing with an inlet opening in the front end thereof. The opening provides an intake for air delivery to the turbine motor. An exit opening controlled by vents on the downstream side of the rotor of the turbine allows for variable amounts of air to pass across the turbine. In particular, the air passes from the intake through a stator having extremely steep angularly oriented blades and then impinges against the turbine rotor. The air, after it has driven the rotor, passes outwardly through the controlling vents. The torque produced by the turbine rotor is proportional to the mass flow of air through it, which is proportional to the exit opening controlled by the air vents. The turbine torque opposes that produced by the tow cable tension acting on the cable spool. The primary source of said tow cable tension being the tow target drag and weight. If the air vents are opened sufficiently, enough torque will be developed to reel in the tow cable. If the air vents are closed to a point where the turbine torque produced is slightly less than that required to oppose the target weight and drag, the tow cable will reel out. The vents are controlled by a closed-loop feedback control system that serves to maintain turbine rotational speed at a predetermined level. Turbine speed is measured by a tachometer that is driven by the turbine shaft. The output of the tachometer is input to a set of processing electronics which compares it to the desired reeling speed and outputs an electrical signal to drive a servo-motor which in turn drives the air vents in a direction so as to adjust the turbine speed to approach more closely the desired turbine speed. The closed-loop feedback control system allows precise control of turbine and reeling speed over a wide range of aircraft speed and altitude without operator monitoring.

In the novel closed-loop feedback control system of the present invention, the turbine rotor speed is sensed by a tachometer which is coupled to a shaft driven by the turbine. The tachometer output voltage is introduced into a set of processing electronics which compares the tachometer voltage to a pre-selected set point voltage which corresponds to a desired turbine rotational speed. The difference between the desired and actual tachometer voltage and its derivative and integral values with respect to time are mixed and amplified to drive a servo-motor which adjusts the air vent opening in a direction that will cause either the turbine to accelerate or decelerate rotational speed until the desired rotational speed is achieved.

The air vent and closed loop feedback control system of the present invention achieves precise automatic control of the turbine rotational speed and avoids oscillations in turbine speed by taking the derivative of the tachometer voltage with respect to time and mixing it with the servo-drive voltage utilized to drive the servo-motor that drives the air vents. Although such derivative control greatly increases the speed of response of the close loop feedback system and thereby minimizes speed overshoot and oscillations in turbine speed, it also increases the circuits sensitivity to electromagnetic interference which eminates from both conducted and radiated soruces of electromagnetic energy which is particularly prevalent in military applications. Such electromagnetic interference can result in false signals being sent to the servo-motor which can thereby result in surging of the turbine and result in inaccurate speed control. In order to eliminate such undesirable surging problems, the present invention utilizes the integral value of the incoming tachometer signal with respect to time and mixes the same with the servo-drive voltage. Due to this novel aspect of the control electronics of the present invention, such surging is eliminated whereby proper turbine rotational speed can be achieved even in electromagnetic interference environments.

In addition, the present invention utilizes a unique air vent actuation mechanism wherein rotation of a servo-motor is converted to vent door movement. The rotation of the servo-motor shaft drives an arm which is connected to a link coupled to a rotating disk. Rotation of the servo-arm causes disk rotation to drive the vent door connecting rods extending between the disk and the vent door to either their open or closed vent door position. The arm, link and disk members are designed such that when the vent doors are in the closed position, the arm is maintained in an over-center locking position with respect to internal ram air pressure being exerted on the vent doors. Such an over-center locking feature ensures that the vent doors will remain closed against internal ram air pressure impinging against the vent doors in the event that power is removed from the servo-motor which is the case during aircraft ferry operations when the reeling machine is not in use.

DESCRIPTION OF THE DRAWINGS

These as well as other features of the present invention will become more apparent upon reference to the drawings wherein:

FIG. 1 depicts the turbine air vent reeling machine of the present invention attached to an aircraft wing and in juxtaposition to an aerial tow target;

FIG. 2 is a front elevational view of the turbine air vent reeling machine with the aerial tow target in lateral relationship thereto;

FIG. 3 is a cross-sectional view of the turbine air vent reeling machine of the present invention taken about lines 3—3 of FIG. 2;

DESCRIPTION OF THE PREFERRED EMBODIMENT

Figure 4:
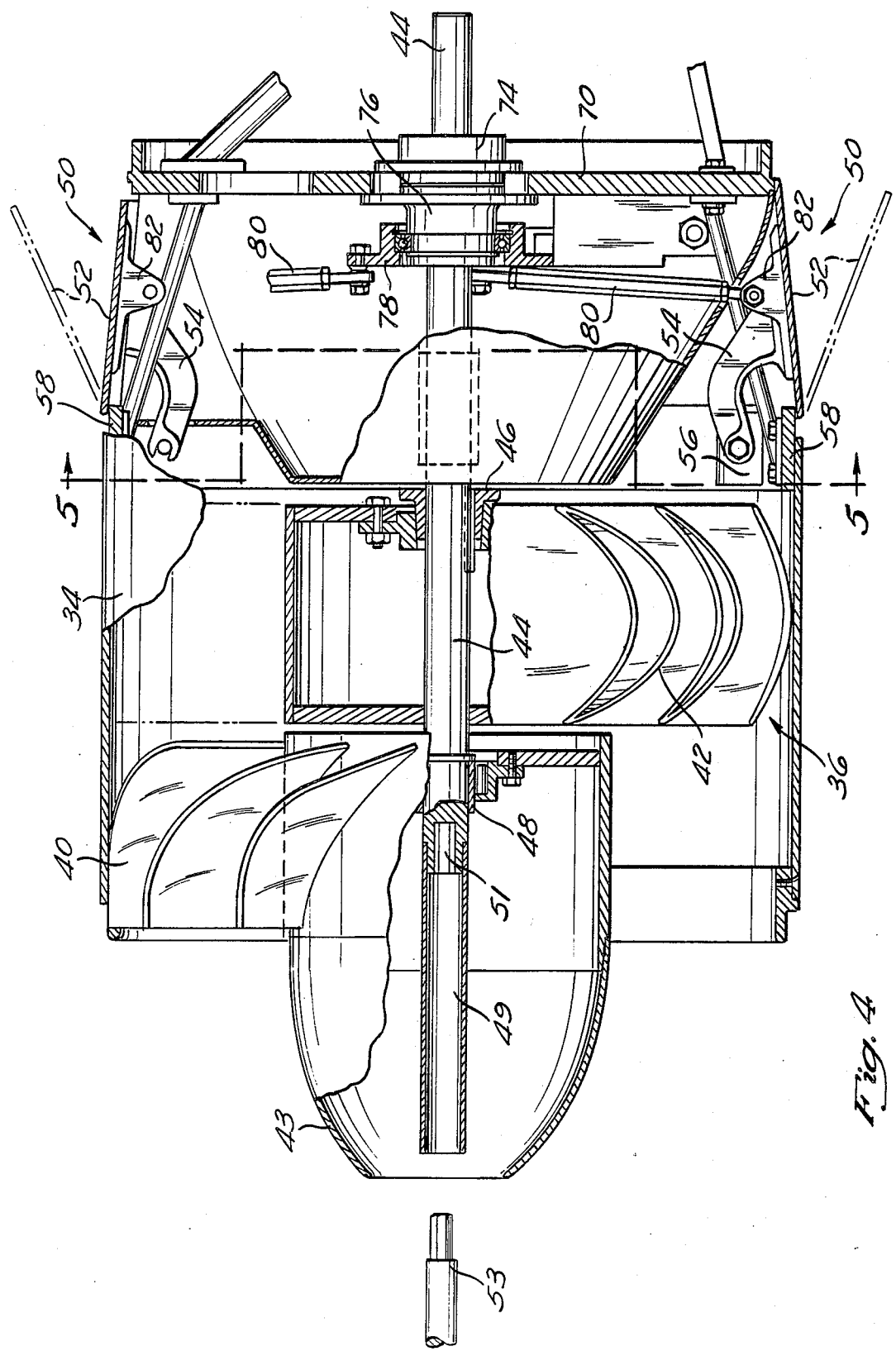
FIG. 4 is an enlarged cross-sectional view of the turbine head and air vent mechanism of the present invention.

Referring generaly to FIGS. 1 through 3, the turbine air vent reeling machine of the present invention (designated generally by the numeral 10) is depicted. For purposes of illustration and not by way of limitation, the turbine air vent reeling machine 10 is shown mounted to the wing 12 of a conventional aircraft (not shown) via rigid connections between the turbine air vent reeling machine 10 and the aircraft pylon 14. A aerial tow target 16 is attached to a tow cable 20 through a connecting link 18 such that the target 16 is maintained in juxtaposition to the turbine air vent reeling machine. As will be explained in more detail infra, the reeling out and reeling in of the tow cable 20 deploys and/or retracts the target 16 from the wing 12 of the aircraft during operation of the turbine air vent reeling machine. Those skilled in the art will recognize that the turbine air vent reeling machine 10 can be utilized for controlling the paying in and paying out of all types of targets to be towed by an aircraft or the like such as aerial socks, aerial tow targets formed of strands and targets in the form of other aircraft or the like and for purposes of this application, the term "target" will be defined to include all such other aircraft towable targets.

Referring more particularly to FIG. 3, the turbine air vent reeling machine 10 of the present invention is composed generally of housing 30 having an elongate cylindrical aft portion 32 and an enlarged bulbous frontal portion 34. The frontal portion 34 of the housing 30 encloses the turbine elements and turbine control portions designated generally by the numeral 36 while the aft portion 32 of the housing 30 encloses the reeling and transmission portions of the present invention designated generally by the numeral 38.

Referring more particularly to FIGS. 3 and 4, the detailed construction of the turbine elements and turbine control portions 36 of the present invention may be described. In the preferred embodiment, the turbine elements 36 comprise an approximate seventeen inch diameter single staged fixed blade impulse turbine consisting of a stationary stator 40 and rotating rotor 42. The stator 40 serves to conduct air entering through the opening 35 formed in the frontal portion 34 of the housing 30 to impinge upon the rotor 42. To better direct air toward the stator 40, an internal bell housing 43 is additionally provided. The turbine 36 has only one moving component, namely, the rotor 42 which is mounted upon a rotor shaft 44 that is journalled by bearings 74 and 48. As will be recognized, the rotor 42 provides power or torque for reeling in the cable 20 attached to the target 16 as well as serves as a power dissipator or brake during the reeling out phase or deployment of the target 16. The rotor 42 and stator 40 are shrouded by the frontal portion 34 of the housing 30 to direct ram air into and past the stator 40 and rotor 42.

To provide variable speed for the rotor 42, a variable area air vent system designated generally by the numeral 50 is provided which is located directly aft of the rotor 42 to control the amount of air passing through thr rotor 42 within the frontal portion 34 of the housing 30. In order to permit ease in manually turning the rotor 42 in maintanence applications a rotor shaft extention 49 is rigidly attached to the rotor drive shaft 44 to extend arcially within the bell housing 43. The extension includes an internal hex head socket 51 sized to matingly receive an internal hex wrench 53 utilized by maintenance personnel.

The stator 40 and rotor 42 are preferably formed having twelve and sixteen blades respectively. The stator 40 directs the air flow at an approximate seventy-five degree angle against the rotor 42 which rotor has an entry and exit angle of approximately sixty-five degrees. Thus, directional turning of the inlet air by the stator 40 as it is actually received from the inlet opening 35 of the housing 30 is approximately seventy-five degrees. This angle produces a flow stream that is substantially more tangential than axial in direction, thus the angle-of-attack at which this flow stream from the stator 40 approaches the leading edge of the rotor blade 42 is not a strong function of the tangential speed of the rotor 42. In fact, within the normal operating speed range of the rotor of 3500 rpm, the angle-of-attack of the stator flow with respect to the rotor blade leading edge is confined within the range of 15 degrees. Since the angle-of-attack never exceeds an absolute value of 15 degrees airfoil stall of the rotor blade is averted; such stall would greatly reduce the rotor's ability to deliver the required torque, in fact is the reason prior art turbine designs such as proposed by Cotton, etc. were incapable of bi-directional operation without variable pitch rotor blades. This blade design allows the turbine 36 to function in a reversible manner as hereinafter described such that bi-directional turning of the rotor 42 is accomplished.

The exit angle of the rotor 42 is preferably provided to be approximately sixty-five degrees as well as the entry angle being sixty-five degrees so as to provide this bi-directional rotational function of the rotor 42. As will be previously stated, the high blade angles of the rotor 42 and stator 40 minimize the changes in relative angle of attack with respect to the R.P.M. of the rotor 42. This thereby permits bi-directional turbine rotation without encountering turbine stall. It is believed that the foregoing angle ranges can vary with regard to the stator by approximately plus or minus ten degrees.

Figure 5:
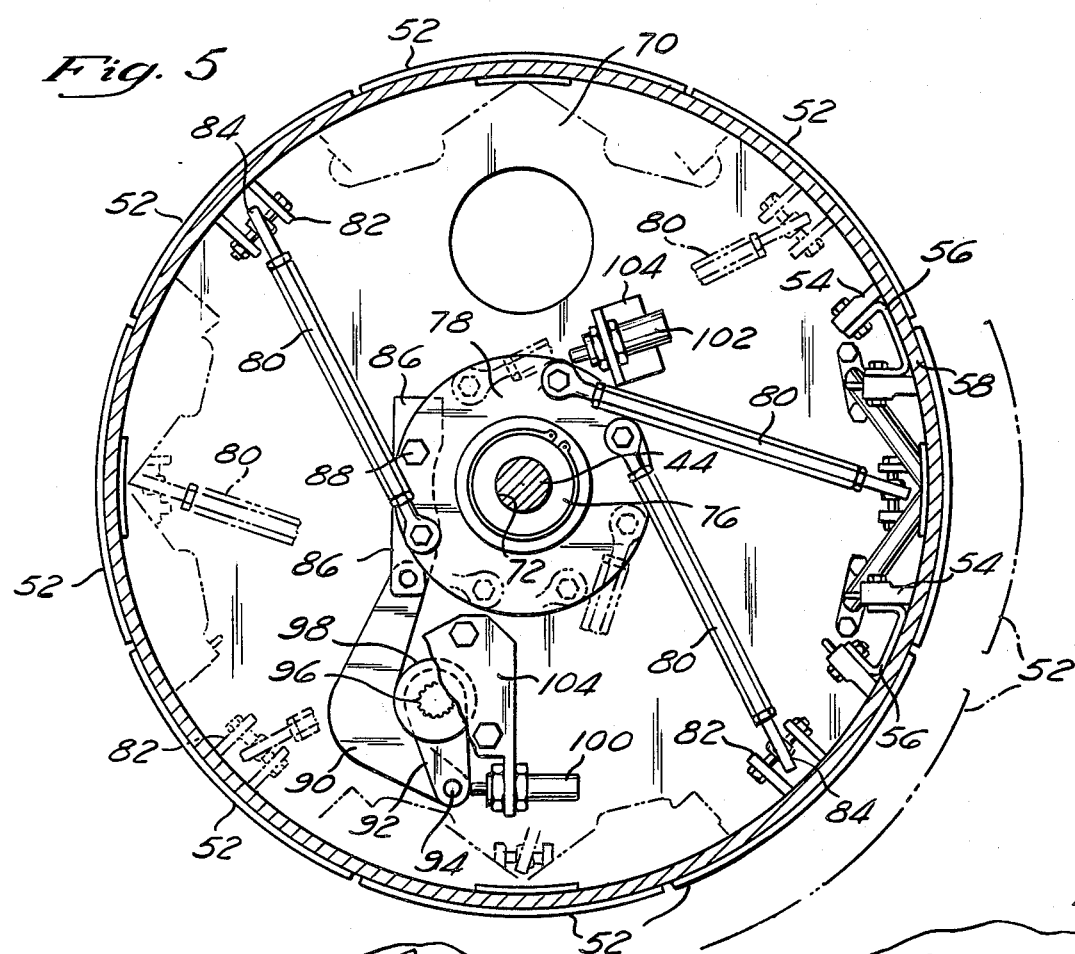
FIG. 5 is an enlarged plan view of the air vent actuation mechanism of the present invention taken about lines 5—5 of FIG. 4.

In effect, the angle of attack of the stator 40 can vary from sixty-five to eighty-five degrees. The rotor 42 can have its entry and exit angles varied by as much as plus or minus fifteen degrees from its preferred sixty-five degree angle of entry and exit. Thus, the angles can range from fifty to eighty degrees. As previously stated, the air vent control system 50 of the present invention is disposed just aft of the rotor 42 and is designed to vary the amount of ram air passing through the rotor 42. As best shown in FIGS. 4 and 5, the air vent system 50 is composed of a plurality of individual arcuate shaped vent doors 52 which are extensible radially outward from their full line position to their phantom line position show in FIGS. 4 and 5. As will be recognized, when the vent doors 52 are maintained in their closed full line orientation, air flow through the stator 40 and rotor 42 is blocked while when the vent doors 52 are in their open orientation indicated by the phantom lines in FIGS. 4 and 5, air flow through the stator 40 and rotor 42 is permitted with the exit air traveling from the rotor 52 and proceeding radially outward through the openings formed by the vent doors 52 being radially extended from the frontal portion 34 of the housing 30.

Figure 8:
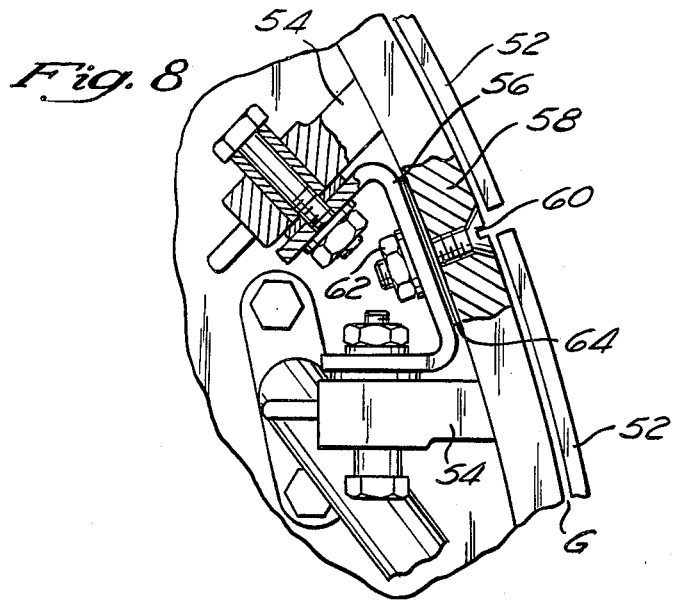
FIG. 8 is an enlarged partial cross-sectional view depicting the vent door hinge mechanism of the present invention.

In the preferred embodiment, each of the vent doors 52 include a pair of generally L-shaped pivot arms 54 which are attached to their inside surfaces adjacent their opposite ends and extend upward beyond the top edge of the vent doors 52 to be hinged to a bracket 56 (best shown in FIGS. 4 and 8). The hinge brackets 56 are formed in a generally C-shaped configuration and are rigidly mounted to a structural mounting ring 58 via two counter-sunk machine screws 60 and nut 62. The structural mounting ring 58 is positioned just aft of the turbine rotor 42 and is rigidly connected to the frontal portion 34 of the housing 30. The design of the hinge brackets 56 permit attachment of adjacent vent doors 52 to a common bracket 56 thereby being advantageous due to reduced weight and reduced aerodynamic drag. Further, the use of such hinge brackets 56 being mounted to the structural ring 58 by way of the counter sunk fasteners 60 and nuts 62 permits one or more shims 64 to be positioned between the bracket 56 and structural ring 58 to adjust the gap G existing between the vent doors 52 and ring 58 to ensure that the vent doors 52 do not bind during pivotal extension from the ring 58.

Each of the vent doors 52 are pivoted from a fully open to fully closed position by way of a novel vent actuation mechanism which is best depicted in FIGS. 4 through 7. The aft wall of the frontal portion 34 of the housing 30 is formed as a rigid structural plate 70 which additionally serves as a common mounting plane between the frontal portion 34 and aft portion of the housing 30. An aperture 72 is formed through the center axis of the plate 70 through which the drive shaft 44 of the rotor 42 extneds. A flange 74 and 76 is rigidly attached to opposite sides of the plate member 70 and serve as bearing surfaces for rotation of the drive shaft 44 of the rotor 42.

A structural plate-like disk is coaxially positioned upon one end of the flange 76 and is adapted for coaxial rotational movement thereabout. The disk 78 mounts a plurality of connecting rods 80 each of which extends from the disk 78 to a respective mounting bracket 82 rigidly attached to the inside surface of each of the vent doors 52. The connecting rods 80 are mounted to the disk 78 by means to permit rotational movement of the connecting rods 80 about the axis of their connection means while the opposite ends of the connecting rods 80 are mounted to the brackets 82 by a universal joint connection 84. A clevis 86 is mounted to one side of the disk 78 by way of machine screws 88. One end of the clevis 86 is hingedly connected to a generally L-shaped linkage 90. The opposite end of the linkage 90 is connected for rotational movement to an arm 92 as by way of a pivot pin 94. The arm 92 additionally engages a spline 96 of a conventional electric servo-motor 98 which is mounted to the structural plate 70 and extends forward toward the rotor 42.

Figures 6, 7:
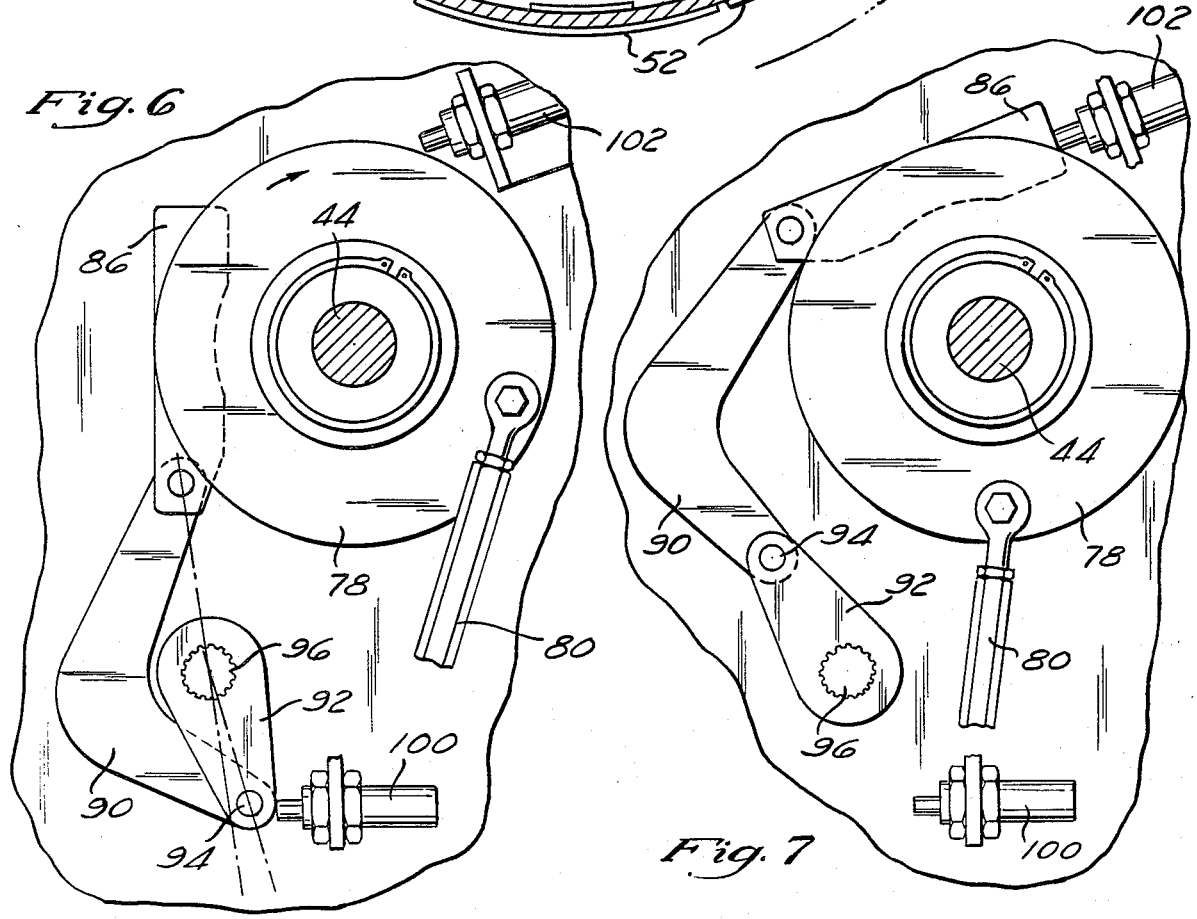
FIG. 6 is a partial plane view illustrating the vent door actuation mechanism in a closed orientation.
FIG. 7 is a partial plan view illustrating the vent door actuation mechanism in an open orientation.

The operation of the vent door actuation mechanism can best be understood by reference to FIGS. 6 and 7 with FIG. 6 depicting the vent door actuation mechanism in its initial or fully closed position while FIG. 7 depicts the vent door actuation mechanism in its subsequent or fully open position. In operation, actuation of the servo-motor 98 causes a rotation of the spline 96 of the servo-motor 98. As shown in FIG. 6, clockwise rotation of the spline 96 causes a corresponding rotation of the arm 92 which drives the linkage 90 in an upward direction (as viewed in FIG. 6). This upward movement of the linkage 90 causes the clevis 86 to impart a clockwise rotation to the disk 78. The rotation of the disk 78 extends each of the connecting rods 80 radially outward thereby driving the vent doors 41 from their closed position shown in FIG. 5 outwardly toward an open position. Continued rotation of the motor spline 96 in a clockwise direction causes the arm 92, linkage 90 and clevis 86 to assume the position indicated in FIG. 7 which represents a full open vent door configuration, i.e., wherein the vent doors 52 extend to their phantom line position shown in FIGS. 4 and 5.

As will be recognized, rotation of the spline 96 of the servo-motor 98 in a counter-clockwise direction causes a corresponding counter-clockwise rotation of the disk 78 wherein the vent doors move from their fully open position back toward their fully closed position. To prevent any over-extension of the vent doors 52 both in their fully open and fully closed position, a pair of conventional limit switches 100 and 102 are mounted upon brackets 104 extending from the plate 70 and are positioned to abut one end of the arm 92 and clevis 86 respectively, at the vent door fully open and fully closed positions respectively, to discontinue any further rotation of the servo-motor spline 96.

As will be recognized, rotation of the arm 92 of approximately 160 to 170 degrees results in rotation of the disk 78 of approximately 70 to 75 degrees. Similarly, such disk rotation results in translational pivotal movement at the trailing edge of the vent doors 52 of approximately three inches outward from the housing 30.

It is an important feature of the vent door actuation mechanism that the structure is capable of withstanding the internal ram pressure applied to the inner surfaces of the vent doors 52 during operation which would tend to force the vent doors 52 toward a fully open position. The particular vent structure depicted in FIGS. 5 and 6 is so designed such that when the vent doors 52 are in their closed position, the arm 92 is in effect, in an over-center locking position with respect to outward pressure exerted upon the vent doors 52. This over-center locking feature is illustrated by the phantom lines in FIG. 6 wherein a line drawn through the axis of the pin 94 and motor spline 96 is always offset (to the right as viewed in FIG. 6) from a line drawn through the axis of the spline 96 and the connection point of the linkage 90 and clevis 86. As such, when internal ram pressure is applied to the interior surfaces of the vent doors 52 which would tend to cause a clockwise rotation of the disk 78, the arm 92 by geometric principals, is continuously urged in a counter-clockwise direction. As such, the vent doors 52 will remain closed against the internal ram air pressure within the turbine in the event that power is removed from the servo-motor 98 whereby rotation of the rotor 42 will be discontinued and will prevent any unstable runaway rotation of the turbine 42 during flight of the aircraft.

From the foregoing, it will be recognized that the torque produced by the rotor 42 during in flight operation upon an aircraft, is dependent upon the opening and closing of the vent doors 52, i.e., when the vent doors 52 are in a fully open position, the flow of air through the rotor 42 is greatest whereas when the vent doors 72 are in a fully closed position, air flow across the turbine rotor is discontinued such that the rotor 42 does not provide any torque to resist target drag and weight. In order to accurately control the rotational speed of the rotor 42, the present invention additionally incorporates a novel closed loop feedback control system which is depicted in block diagram form in FIG. 9.

Figure 9:
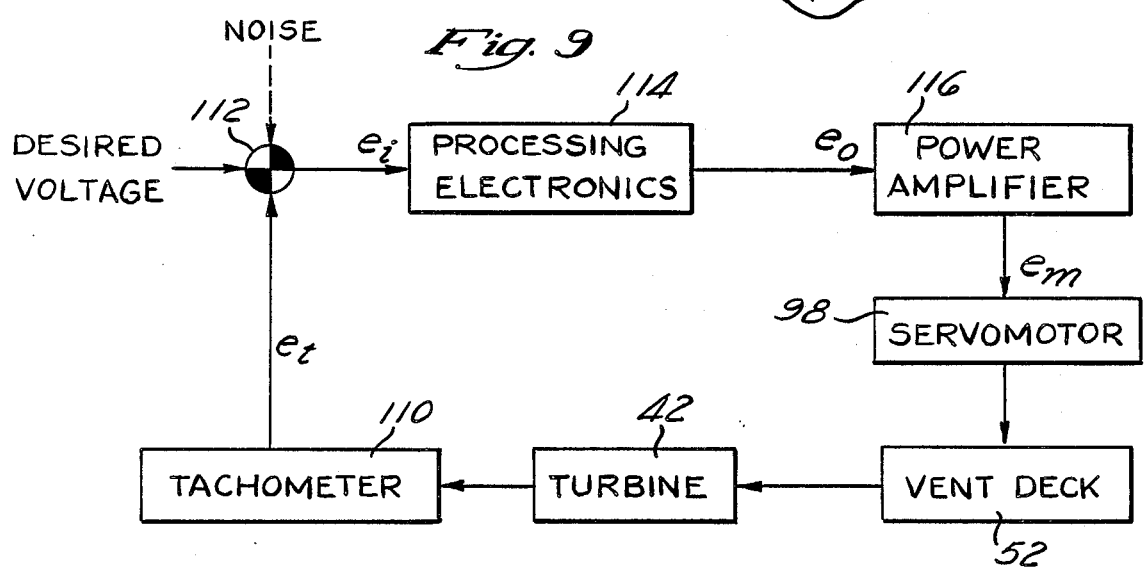
FIG. 9 is a block diagram of the closed loop feedback control and turbine/vent door system of the present invention.

As shown in FIG. 9, a tachometer 110 is coupled to the drive shaft 44 of the turbine 42 to generate an output voltage $e_t$ which varies according to the rotational speed of the turbine 42. The output voltage from the tachometer $e_t$ is connected to a summing junction and comparator 112 which compares the tachometer voltage $e_t$ to a desired voltage representative of the desired rotational speed of the turbine 42. For analysis purpose, any extraneous noise introduced into the system is considered to be introduced at that summing junction as well. The resultant voltage from the junction and comparator 112 provides an input voltage $e_i$ which is then processed in a novel processing electronics 114 wherein the derivative and intregral values of the input voltage with respect to time and a constant multiplied by the input voltage (designated as $e_o$) is applied to a conventional power amplifier 116. The amplified voltage signal $e_m$ is then used to drive the servo-motor 98 of the vent actuation mechanism and thereby mechanically drive the vent doors 52 to adjust the vent openings in an appropriate direction that will cause the rotation of the turbine 42 to accelerate to decelerate until the desired speed is reached.

As will be recognized, the control circuitry provides a closed loop system which continuously monitors the turbine rotational speed to effectuate proper control of the turbine 42 during operation. A unique feature of the present invention is the use of the processing electronics 114 to achieve a precise control of the turbine 42 rotational speed and to avoid surging and seeking around a desired set point speed. This is achieved by processing electronics taking the derivative of the input voltage $e_i$ with respect to time and mixing it with a voltage that is proportional to the input voltage $e_i$ to obtain $e_o$ which is then applied to obtain the servo-drive voltage $e_m$. However, although this time derivative of the input voltage $e_i$ reduces surging, and seeking characteristics, by reducing overshoots in rotational speed, it greatly increases the sensitivity of the control loop circuitry to electromagnetic interference eminating from both conducted and radiated sources which is particularly prevalent in military environments. Such interference can oftentimes result in false voltage signals being sent to the servo-motor 98 which can result in oscillations of the servo-motor 98 and vent doors 52 and result in inaccurate speed control.

In order to eliminate these deficiencies, the integral of the incoming voltage signal with respect to time is obtained and mixed with the derivative and proportional voltage as well.

The equation describing the processing electronics 114 and its transfer function is the following:

$$e_o/e_i = - \frac{A_1 D + A_2}{1 + A_3 D + A_4 D^2}$$

where: D=The differential operator, and: $A_x$=a constant set by selection of resistance and capacitance values (a unitless quantity). Typically, resistive and capacitive values are selected to achieve the following:

$A_1$=2.5-11.0 preferably 5.30
$A_2$=5.0-25.0 preferably 15.45
$A_3$=0.01-0.28 preferably 0.07
$A_4$ 0.0-0.70 preferably 0.0011

Figure 10:
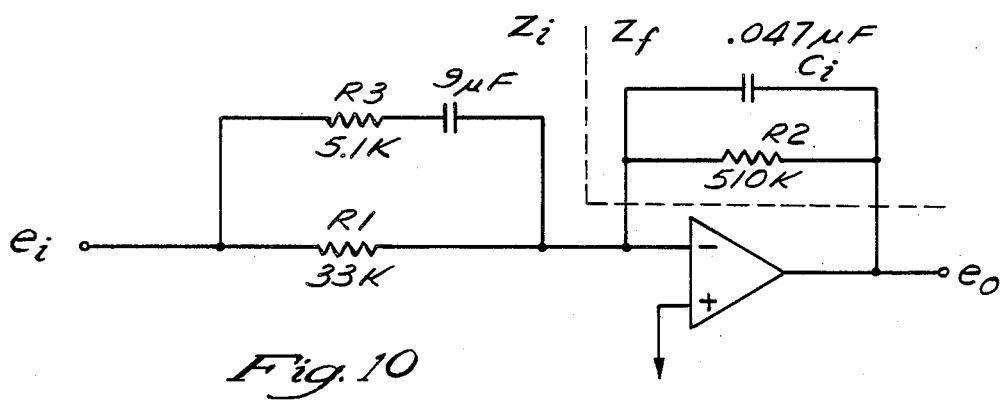
FIG. 10 is a electrical schematic of the processing electronics depicted in FIG. 9.

The actual circuitry for the processing electronics 114 is depicted in FIG. 10 with the resistive and capacitive values shown thereon. As will be recognized, the circuitry comprises an operational amplifier which operates in an inverting mode with $(e_o/e_i)=(Z_f/Z_i)$ with $Z_f$ equalizing the total feedback impedence and $Z_i$ equalizing the total impedence of the input side of the circuit. Further, it will be recognized that the 9 μf capacitor disposed n the input side of the circuit is responsible for derivative control while the 0.047 μf is responsible for integral control. Further, $R_1$ and $R_2$ are the primary resistance elements responsible for the proportional gain of the amplifier. As such, by use of the processing electronics 114, which produce derivative, proportional and integral voltage values, accurate speed control of the turbine rotor 42 is achieved automatically in operation, without the previous surging and seeking rotor speed characteristics associated in the prior art.

Referring to FIG. 3, the detailed construction of the transmission and reeling portions 38 of the present invention housed in the aft portion 32 of the housing 30 may be described. As shown, the turbine output shaft 44 extends through the structural plate 70 and is connected via a roller chain 160 to an idler gear 162, mounted for rotational movement to the structural plate 70. The idler gear 162 is connected via a drive shaft 164 to an additional idler gear 166. A roller chain 168 connects the idler gear 166 to a spool drive gear 170 mounted upon a spool shaft 172. The spool shaft 172 includes a co-axial tow cable spool 173 and extends axially within the interior of the aft portion 32 of the housing 30 and is journalled at opposite ends to a pair of bulk head 174 and 176. The spool shaft 172 additionally mounts a level wind drive sprocket 178 adjacent its distal end which cooperates with a roller chain 180 to drive a level wind sprocket 182. The level wind sprocket 182 is connected to a diamond groove shaft 184 which, as with the spool shaft 172, extends between the bulk heads 174 and 176 and is journalled on opposite ends for rotation about its axis. A conventional ball reversing carriage 186 is mounted upon the diamond grooved shaft 184 and is adapted to reciprocate along the length of the shaft 184 by virtue of a ball engaging the diamond groove in an conventional manner.

As shown, the tow cable 20 is connected at its distal end to the wind spool 173 disposed upon the spool shaft 172 and extends over a pulley 188 disposed upon the carriage 186. As such, during simultaneous rotation of the spool 173 and diamond groove shaft 184 caused by rotation of the rotor 42, the carriage 186 lays the tow line cable 20 axially along the length of the spool 173. This is accomplished by the carriage 186 following within the grooves of the diamond groove shaft 184; so that the carriage 186 reciprocates back and forth along the length of the diamond groove shaft 184 reveresing direction upon reaching opposite ends of the shaft 184.

In order to prevent any excess strain upon the pulley 188 or other attendant apparatus, a pair of hydro-pneumatic shock absorbers 190 (only one of which is shown in FIG. 3 for clarification) are utilized. The shock absorbers 190 allow for a sheave 192 to be cushioned due to the fact that is it journalled to the pistons 194 of the shock absorber 190. The cable 20 passes over the sheave 192 onto a second sheave or pulley 196 which is rigidly mounted for rotational movement upon the bulk head 176. A third sheave or pulley 198 is additionally provided to initially receive the cable 20. The foregoing configuration generally allows for shock absorption in the tow cable as it is paid out or pulled in so that undue shocks due to increases or decreases in tension on the line 20 can be accomodated.

With the structure defined, the general overall operation of the turbine air vent reeling machine 10 of the present invention may be described. Initially, the tow cable 20 must be attached via a connection link 18 to the tow target 16. After the support aircraft is in flight, the tow target 16 may be jettisoned from the pylon 14 of the aircraft wing 12 in a conventional manner and thus, be towed solely be interconnection of the tow cable 20 with the turbine air vent reeling machine 10. To permit the tow target 16 to be towed a sufficient distance from the aircraft, the plural air vent doors 52 may be maintained in a closed position wherein reel out of the cable 20 will commence, resisted initially by the internal frictional forces and inertia of the reeling machine. The cable spool will be accelerated by the weight and drag of the towed target until it approaches the predetermined rotor speed, which via the direct drive gearing is related to the tow cable payout speed. The rotor speed is monitored and controlled by the closed loop control system depicted in FIG. 9 and is maintained within the desired limits by corresponding movement of the air vent doors 52 wherein impinging ram air is directed over the rotor blades 42 through the stator 40 to apply a counter-rotational force in opposition to the pay out drag force exerted by the target 16. As such, an effective braking force applied directly from the rotor 42 may be utilized to maintain a desired reel out speed of the cable 20.

When it is desired to reel in the target 16, the air vent doors 52 may be opened to a full position wherein the torque caused by the counter-rotational force applied to the rotor 42 by the impinging ram air will cause the rotor 42 to rotate in an opposite direction and begin reeling in the cable 20. The rotor speed is monitored and controlled by the closed loop control system depicted in FIG. 9 and is maintained within desired limits by corresponding movement of the vent doors 52. The turbine design of the present invention provides a two way function of rotation for braking as well as for driving. In this manner, the rotor 42 can be driven either forwardly for reeling in the target 16 or backwardly by target drag for reeling out the target 16. This is, of course, substantially dependent upon the nature of the angle of attack to prevent stall and the orientation of the stator 40 and the rotor 42 as previously described.

Although certain materials and configurations have been described in relation to this invention, those skilled in the art will recognize that various modifications can be made to the same without departing from the spirit of the present invention and such modifications are clearly contemplated herein.

What is claimed is:

1. An air turbine driven reeling machine for selectively reeling a cable inwardly and outwardly of an aircraft to control the position of a device towed by the aircraft, comprising:

a housing adapted to be mounted to an aircraft, said housing having an air inlet adjacent one end thereof;

a turbine mounted within said housing, said turbine including a fixed blade rotor rotatably mounted within said housing and a stator for directing airflow from said air inlet to said rotor;

an output shaft connected to said rotor including means for attachment of said output shaft to a cable attachable to a device towed by the aircraft;

vent means for varying the flow of air passing through said rotor to provide a desired rotational speed of said rotor and said output shaft for reeling the cable inwardly and outwardly from the aircraft;

means for controlling the operation of said vent means to avoid undesirable surging and seeking speed response of said rotor about said desired rotational speed;

said stator being stationary mounted within said housing between said air inlet and said rotor, and including a plurality of stator blades each having an angle of attack within the range of 65 to 85 degrees, said rotor including a plurality of fixed rotor blades each having an angle of attack within the range of 55 to 75 degrees, said angles of attack of said stator blades and said rotor blades cooperating to permit bi-directional rotation of said rotor without turbine stall, said vent means comprising a plurality of vents positioned downstream from said rotor, said vents being movable between open and closed positions, and actuation means for moving said vents between their open and closed positions, said actuation means comprising a servo-motor actuated linkage connected to each of said plural vents and said servo-motor actuated linkage including means for providing an over-center locking configuration to resist airflow forces exerted on each of said plural vents.

2. The air turbine driven reeling machine of claim 1 wherein said controlling means comprises:

means for reusing the operational rotational speed of said rotor;

means for selecting the desired rotational speed of said rotor;

means for comparing the operational and desired rotational speeds of said rotor and generating signal in response thereto;

means for taking the derivative and integral values with respect to time of said generated signal to generate an adjusted signal; and means for activating said vent actuation means in response to said adjusted signal.

3. The air turbine driven reeling machine of claim 2 wherein said means for taking the derivative and integral values with respect to time comprises a processing electronics transfer function defined by the equation:

$$e_o/e_i = -\frac{A_1 D + A_2}{1 + A_3 D + A_4 D^2}$$

where: D is the differential operator, and: $A_1$ is a unitless constant between the values of 2.5 and 11.0, $A_2$ is a unitless constant between the values of 5.0 and 25.0, $A_3$ is a unitless constant between 0.01 and 0.28, and $A_4$ is a unitless constant between 0.0 and 0.70.

4. The air turbine reeling machine of claim 3 wherein $A_1$ is equal to 5.30, $A_2$ is equal to 15.45, $A_3$ is equal to 0.07, and $A_4$ is equal to 0.0011.

5. The air turbine reeling device of claim 2 further comprising an elongate member connected to said output shaft and extending axially toward said end of said housing, said member formed to permit ease of installation of drive shaft for manual rotation of said rotor during maintenance.

* * * * *

REEXAMINATION CERTIFICATE (1283rd)

United States Patent [19]

Yates et al.

[11] B1 4,770,368

[45] Certificate Issued    May 15, 1990

[54] TURBINE/AIR VENT REELING MACHINE

[75] Inventors: John S. Yates, Fountain Valley; Roger D. Brum, Irvine, both of Calif.

[73] Assignee: Southwest Aerospace Corporation

Reexamination Request:
No. 90/001,726, Mar. 3, 1989

Reexamination Certificate for:
Patent No.: 4,770,368
Issued: Sep. 13, 1988
Appl. No.: 710,905
Filed: Mar. 12, 1985

[51] Int. Cl.$^5$ .............................................. B64D 3/02
[52] U.S. Cl. ..................................... 244/1 TD; 244/3; 273/361; 254/360
[58] Field of Search ............... 244/1 TD, 3; 273/360, 273/361; 254/274, 276, 360; 328/165, 167; 416/35, 44

[56]     References Cited
U.S. PATENT DOCUMENTS 3,416,058  12/1968  Hill et al.
3,474,349  10/1969  Ellermeyer
4,639,649   1/1987  Seto

OTHER PUBLICATIONS

Greenwood et al, "*Electronics Instruments*", 1948, pp. 322-329, 347-350.

Chesmond, "*Control Sys Technology*", 1982, pp. 298-305.
Electronics Handbook (2 ed Copy 1982) Funk & Christansen Editors, pp. 17-40 to 17-61.

*Primary Examiner*—Galen Barefoot

[57]     ABSTRACT

A turbine/air vent reeling machine for use in aerial towed target applications and the like disclosed characterized by use of a novel turbine head/air vent design which extracts ram air energy from the wind stream impinging upon a moving aircraft for the purpose of driving and braking the reeling machine for pay-in and pay-out of a towed target. Control of the turbine rotational speed is achieved through plural variable opening vents located aft of the turbine head which are driven through an open and closed orientation by a servomotor to throttle the air mass flow through the turbine head. Turbine speed is sensed by a tachometer which is coupled to a shaft driven by the turbine. The tachometer output voltage is introduced into a closed loop control circuit including processing electronics which compares the tachometer voltage to a pre-selected set point voltage corresponding to the desired rotational speed of the turbine. The difference between the desired and actual tachometer voltage and its derivative and integral values with respect to time are mixed and amplified to drive the servo-motor to adjust the vent opening in a direction that will cause the turbine to accelerate or decelerate to a desired operational speed. The servomotor rotation is converted to vent door movement via an actuation mechanism which ensures the vent doors will remain in a closed position in the event the power is removed from the servo-motor.

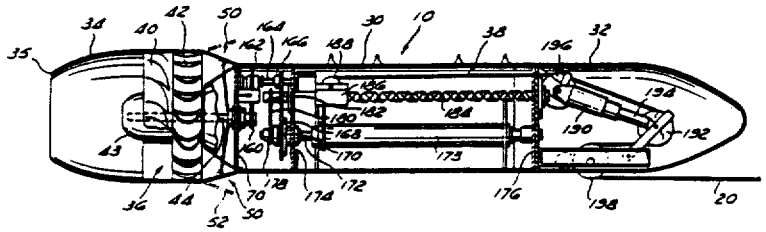

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-5 is confirmed.

New claims 6-9 are added and determined to be patentable.

* * * * *